United States Patent
Yamasaki et al.

(10) Patent No.: US 9,975,193 B2
(45) Date of Patent: May 22, 2018

(54) ROTARY TABLE APPARATUS AND ELECTRIC DISCHARGE MACHINE USING THE ROTARY TABLE APPARATUS

(71) Applicant: FANUC Corporation, Yamanashi (JP)

(72) Inventors: Mizuho Yamasaki, Yamanashi (JP); Yoshinori Makino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 157 days.

(21) Appl. No.: 14/856,711

(22) Filed: Sep. 17, 2015

(65) Prior Publication Data

US 2016/0089739 A1    Mar. 31, 2016

(30) Foreign Application Priority Data

Sep. 25, 2014  (JP) .................................. 2014-195684

(51) Int. Cl.
| | | |
|---|---|---|
| *B23H 11/00* | (2006.01) | |
| *B23H 1/00* | (2006.01) | |
| *B23H 1/10* | (2006.01) | |
| *B23H 7/36* | (2006.01) | |
| *B23Q 11/08* | (2006.01) | |

(52) U.S. Cl.
CPC ............ *B23H 11/003* (2013.01); *B23H 1/10* (2013.01); *B23H 7/36* (2013.01); *B23Q 11/0883* (2013.01); *B23H 11/00* (2013.01)

(58) Field of Classification Search
CPC .......... B23H 1/10; B23H 11/003; B23H 7/36; B23H 11/0883; B23H 11/00
See application file for complete search history.

(56) References Cited

U.S. PATENT DOCUMENTS

| | | | | |
|---|---|---|---|---|
| 6,186,509 B1 * | 2/2001 | Wada | ..................... | F16J 15/002 277/363 |
| 6,698,439 B2 * | 3/2004 | Kamikawa | ........ | H01L 21/67028 134/138 |
| 2002/0148814 A1 * | 10/2002 | Ishiwata | .................. | B23H 1/00 219/69.2 |
| 2010/0237566 A1 * | 9/2010 | Balsells | ................. | F16J 15/166 277/550 |
| 2012/0306161 A1 * | 12/2012 | Floan | ................... | F16J 15/3268 277/572 |

(Continued)

FOREIGN PATENT DOCUMENTS

| | | |
|---|---|---|
| JP | 4-159023 A | 6/1992 |
| JP | 6-42058 U | 6/1994 |
| JP | 6-206121 A | 7/1994 |

(Continued)

OTHER PUBLICATIONS

Machine translation of Japan Patent document No. 2005-118,915-A, Jun. 2017.*

(Continued)

*Primary Examiner* — Geoffrey S Evans

(74) *Attorney, Agent, or Firm* — Hauptman Ham, LLP

(57) ABSTRACT

A rotary table apparatus includes a rotary table body, a table rotor supported on the rotary table body and configured to be rotatable, a driving unit for driving the table rotor, a seal mechanism including a sealer disposed between the rotary table body and the table rotor, and a first supply unit configured to supply clean fluid for use in machining to the seal mechanism.

10 Claims, 5 Drawing Sheets

(56) References Cited

U.S. PATENT DOCUMENTS

2013/0056445 A1    3/2013  Yamasaki

FOREIGN PATENT DOCUMENTS

| JP | 2005-118915 A | 5/2005 |
| JP | 2008-272853 A | 11/2008 |
| JP | 2011-104725 A | 6/2011 |

OTHER PUBLICATIONS

Machine translation of Japan Patenf document No. 2011-104,725, Jun. 2017.*
Machine translation of Japan Patent document No. 6-42,058 U.*
Report of Reconsideration by Examiner in JP Application No. 2014-195684, dated Sep. 29, 2016.
Office Action in JP Application No. 2014-195684, dated Jan. 19, 2016.
Extended European Search Report in EP Application No. 15184060.0, dated Mar. 22, 2016.
Office Action in JP Application No. 2014-195684, dated Sep. 5, 2017, 6 pp.

* cited by examiner

ROTARY TABLE APPARATUS AND ELECTRIC DISCHARGE MACHINE USING THE ROTARY TABLE APPARATUS

RELATED APPLICATIONS

The present application claims priority to Japanese Application Number 2014-195684, filed Sep. 25, 2014, the disclosure of which is hereby incorporated by reference herein in its entirety.

BACKGROUND OF THE INVENTION

1. Field of the Invention

The present invention relates to a rotary table apparatus and an electric discharge machine including the rotary table apparatus.

2. Description of the Related Art

FIG. 6 schematically illustrates a cross section of a rotary table apparatus for, for example, an electric discharge machine. As illustrated in FIG. 6, a casing 1 of a rotary table (rotary table apparatus) 24 encloses a power unit 2 and a speed reducer 3. The speed reducer 3 reduces the rotation speed of the power unit 2. A bearing support 7 is disposed in a front end of the casing 1 and supports a bearing 4. A shaft 5 is fixed to one end of the bearing 4 and a faceplate 6 is fixed to the other end of the bearing 4 in such a manner that the shaft 5 and the faceplate 6 are freely rotatable in synchronization with rotation of the speed reducer 3. A seal mechanism 8 is disposed near the bearing support 7 and includes a sealer 9. The sealer 9 is in contact with an outer peripheral surface of the faceplate 6 so as to prevent working fluid from entering the casing 1 through a clearance 11 between the seal mechanism 8 and the faceplate 6.

During machining of a workpiece with an electric discharge machine, machining waste called sludge is generated and suspended in working fluid in a work tank. As indicated by a flow 18 of working fluid containing sludge, when working fluid containing sludge enters the clearance 11, sludge is attached between the sealer 9 and the faceplate 6. Accordingly, abrasion of the sealer 9 is induced in an early stage. Typical seal mechanisms of rotary tables proposed to date include a mechanism employing an air-seal structure and a mechanism employing a labyrinth structure (see Japanese Unexamined Patent Application Publications Nos. 2011-104725 and 2008-272853).

In application, a rotary table apparatus for an electric discharge machine is placed on a work table disposed in a work tank filled with working fluid, and a workpiece is fixed on a face plate. A seal mechanism is provided in a clearance between a rotary table casing and the face plate so as to prevent working fluid in the work tank from entering a rotary table (see Japanese Unexamined Patent Application Publication No. 2005-118915). However, sludge (fine metal powder) generated during machining flows into the seal mechanism, resulting in a significant degradation of sealing performance.

SUMMARY OF THE INVENTION

It is therefore an object of the present invention to provide a rotary table apparatus that can achieve long-term sealing performance by providing a sludge entrance preventing unit before a seal mechanism, and an electric discharge machine including the rotary table apparatus.

A rotary table apparatus according to the present invention includes: a rotary table body; a table rotor supported on the rotary table body and configured to be rotatable; a driving unit for driving the table rotor; a seal mechanism including a sealer disposed between the rotary table body and the table rotor; and a first supply unit that supplies clean fluid for use in machining to the seal mechanism. The first supply unit corresponds to, for example, a pipe 10 illustrated in FIG. 1.

A rotary table apparatus according to the present invention includes: a rotary table body; a table rotor supported on the rotary table body and configured to be rotatable; a driving unit for driving the table rotor; a seal mechanism including a sealer disposed between the rotary table body and the table rotor; an auxiliary seal mechanism including an auxiliary sealer between the rotary table body and the table rotor; and a second supply unit that supplies clean fluid for use in machining to a space formed between the sealer of the seal mechanism and the auxiliary sealer of the auxiliary seal mechanism. The second supply unit corresponds to, for example, a pipe 10 illustrated in FIG. 2.

The seal mechanism may have a structure separable from the rotary table body.

One or each of the seal mechanism and the auxiliary seal mechanism may have a structure separable from the rotary table body.

In the rotary table apparatus, the seal mechanism may have a discharge port of clean fluid for use in machining.

In the rotary table apparatus, at least one of the seal mechanism or the auxiliary seal mechanism has a discharge port of clean fluid for use in the machining.

A pipe for allowing the clean fluid for use in machining to flow therein may be provided in the sealer of the seal mechanism.

The pipe for allowing clean fluid for use in machining to flow therein may be provided in the auxiliary sealer of the auxiliary seal mechanism.

An electric discharge machine according to the present invention includes the rotary table apparatus disposed in a work tank.

The electric discharge machine may further include a supply amount control unit for controlling an amount of clean fluid for use in machining to be supplied to the first supply unit or the second supply unit of the rotary table apparatus.

With the foregoing configuration according to the present invention, a rotary table apparatus that can achieve long-term sealing performance by providing a sludge entrance preventing unit before a seal mechanism, and an electric discharge machine including the rotary table apparatus can be provided.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
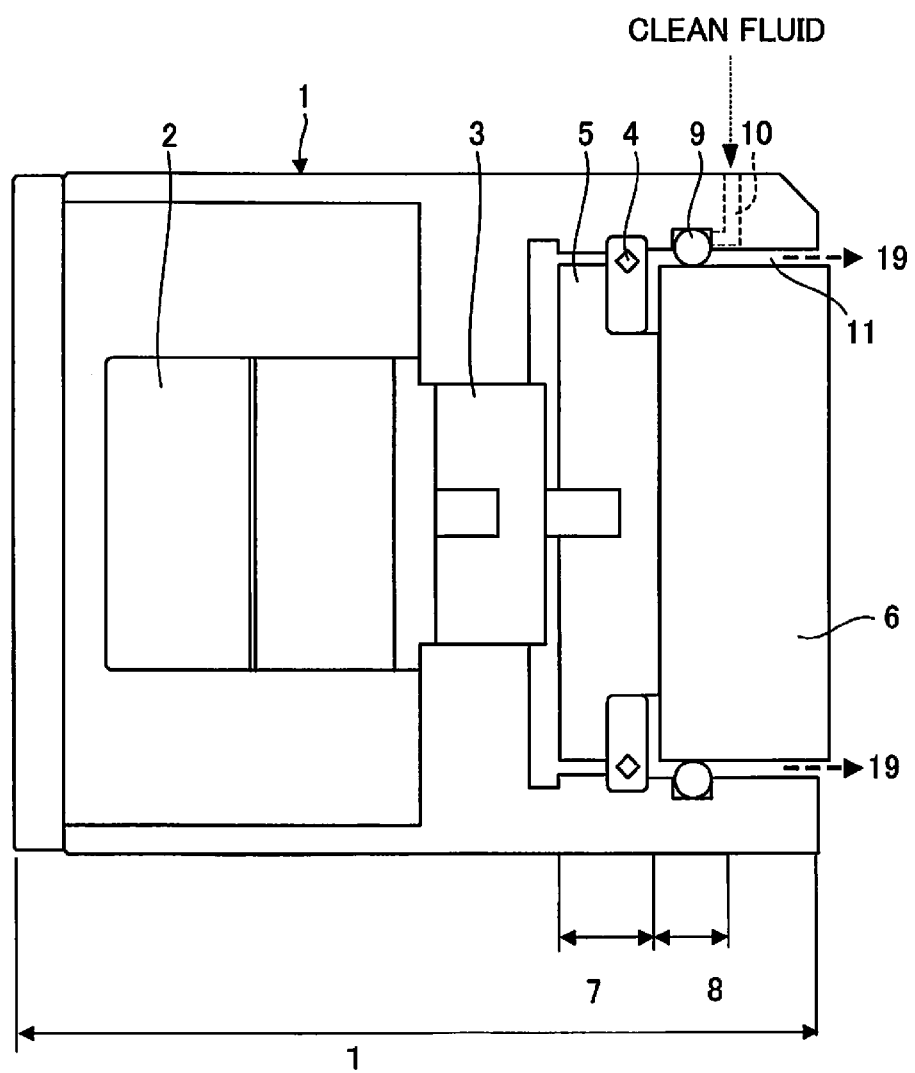
FIG. 1 schematically illustrates a cross section of a rotary table apparatus including a clean working fluid supply pipe.

FIG. 1 schematically illustrates a cross section of a rotary table apparatus including a clean working fluid supply pipe. As illustrated in FIG. 1, a rotary table casing 1 of a rotary table (rotary table apparatus) 24 includes a seal mechanism 8 and a bearing support 7. The casing 1 encloses a power unit 2 serving as a driving unit of a faceplate 6, and a speed reducer 3. The speed reducer 3 reduces the rotation speed of the power unit 2. A bearing support 7 is disposed in a front end of the rotary table casing 1 and supports a bearing 4. A shaft 5 is fixed to one end of the bearing 4 and the faceplate 6 is fixed to the other end of the bearing 4 in such a manner that the shaft 5 and the faceplate 6 are freely rotatable in synchronization with rotation of the speed reducer 3. In FIG. 1, the shaft 5 is fixed to the bearing 4. A workpiece is fixed to the faceplate 6 directly or with a jig.

The faceplate 6 is fixed to the shaft 5. The seal mechanism 8 is disposed adjacent to the bearing support 7 and includes a sealer 9. The sealer 9 is, for example, a rubber O-ring. The sealer 9 is in contact with the outer peripheral surface of the faceplate 6 and, thereby, prevents working fluid from entering the casing 1 through a clearance 11 between the seal mechanism 8 and the faceplate 6.

As also illustrated in FIG. 1, a pipe 10 is provided in order to supply clean working fluid to the seal mechanism 8 in the casing 1. The clean working fluid flowing in the clearance 11 between the seal mechanism 8 and the faceplate 6 prevents working fluid containing sludge from coming into contact with the sealer 9. The clean working fluid refers to fluid that is used for machining a workpiece with an electric discharge machine.

Figure 2:
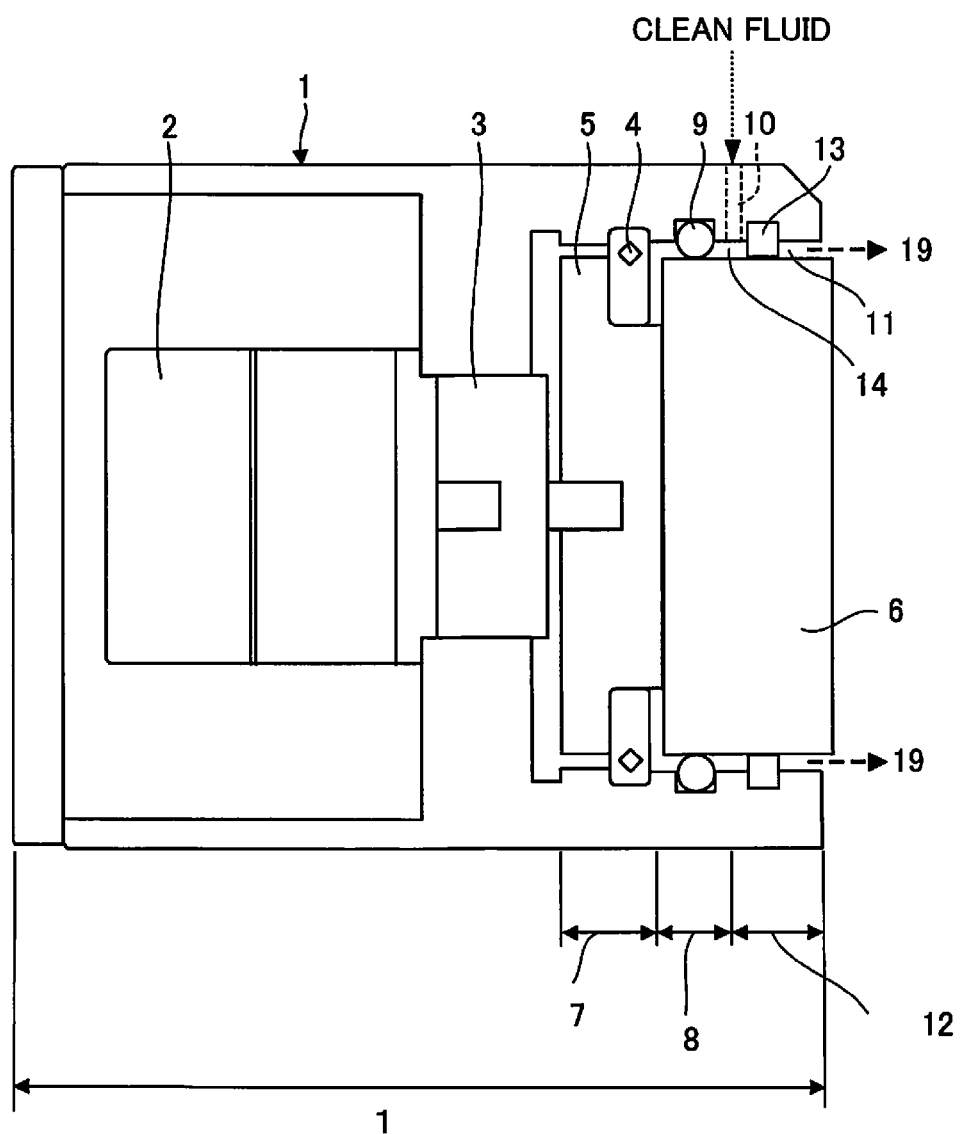
FIG. 2 schematically illustrates a cross section of a rotary table apparatus including an auxiliary seal mechanism.

FIG. 2 schematically illustrates a cross section of a rotary table apparatus including an auxiliary seal mechanism 12. The rotary table casing 1 includes the auxiliary seal mechanism 12, the seal mechanism 8, and the bearing support 7.

In FIG. 2, the auxiliary seal mechanism 12 is disposed outside the seal mechanism 8. The "outside" herein refers to the side opposite to the inner side at which the power unit 2 is located, i.e., is the side closer to the outside of the rotary table casing 1 of the rotary table apparatus 24. In the rotary table casing 1, an auxiliary sealer 13 is attached to the auxiliary seal mechanism 12 so as to be in slight contact or form a minute clearance with the faceplate 6.

A space 14 is formed between the seal mechanism 8 and the auxiliary seal mechanism 12 and is sandwiched between the sealer 9 and the auxiliary sealer 13. When clean working fluid is supplied to the space 14 through the pipe 10, this fluid flows from the rotary table casing 1 outward through a clearance between the auxiliary sealer 13 and the faceplate 6, as illustrated as a flow 19 of the clean working fluid. This ensures prevention of entering of sludge. The amount of clean working fluid to be supplied can be arbitrarily adjusted unit using a working fluid supply unit 25 (see FIG. 5). Thus, the flow rate can be temporarily increased so as to remove sludge accumulated in the clearance 11 between the auxiliary seal mechanism 12 and the faceplate 6.

As a result, simplified cleaning can be performed without the need for an operator to disassemble mechanism parts. In a case where clean working fluid does not need to be supplied during, for example, suspension of machining, supply of the clean working fluid can be stopped. The seal mechanism 8 and the auxiliary seal mechanism 12 may be configured such that the rotary table casing 1, the seal mechanism 8, and the auxiliary seal mechanism 12 can be disassembled. In this case, the seal mechanism 8 and the auxiliary seal mechanism 12 can be easily disassembled. Thus, the time necessary for cleaning or replacing the sealer 9 and the auxiliary sealer 13 can be significantly reduced.

Figure 3:
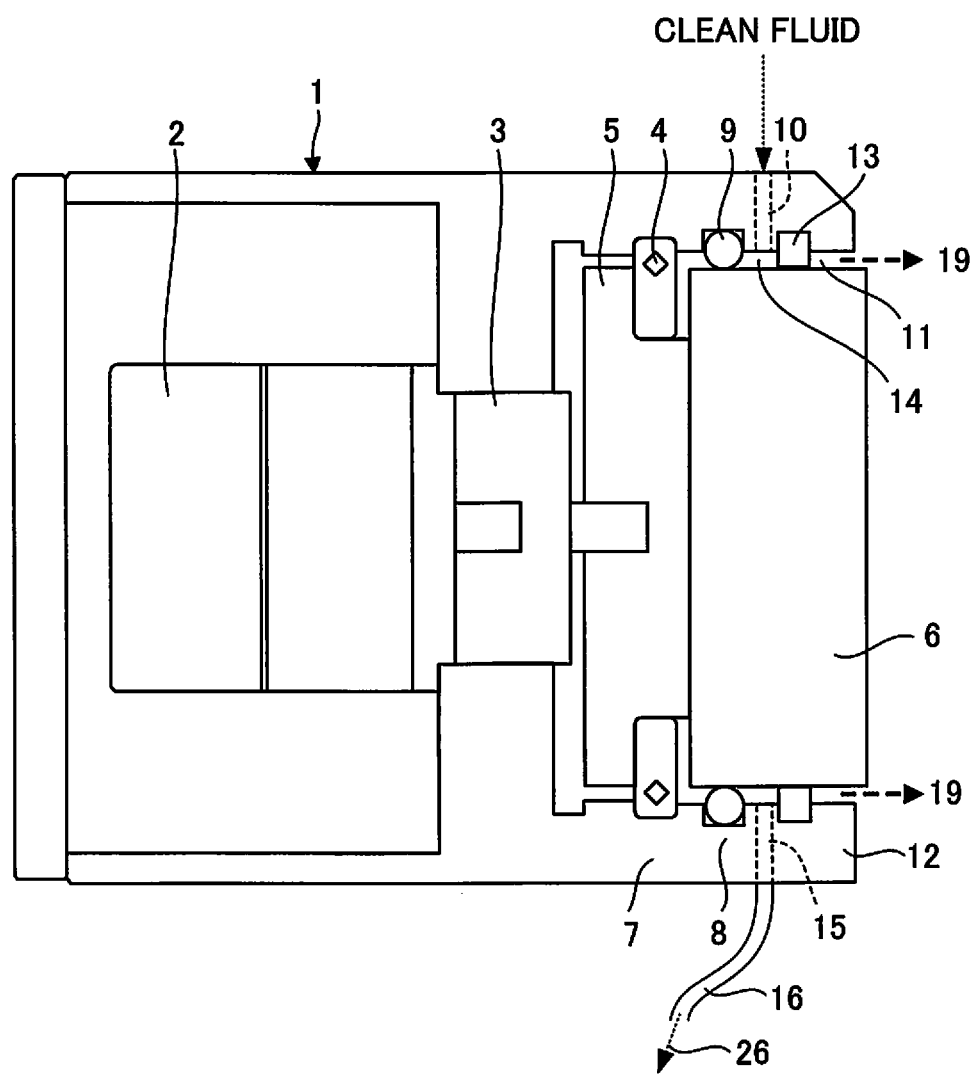
FIG. 3 schematically illustrates a cross section of a rotary table apparatus including a drain port.

With reference to FIG. 3, a side surface of the seal mechanism 8 may be provided with, for example, a discharge port 15 and a discharge tube 16 so that working fluid flows indicated by arrows 19 are changed to only a working fluid flow indicated by arrow 26. This prevents unwanted wettings of the workpiece and the faceplate 6 from occurring in, for example, exchanging workpieces.

Figure 4:
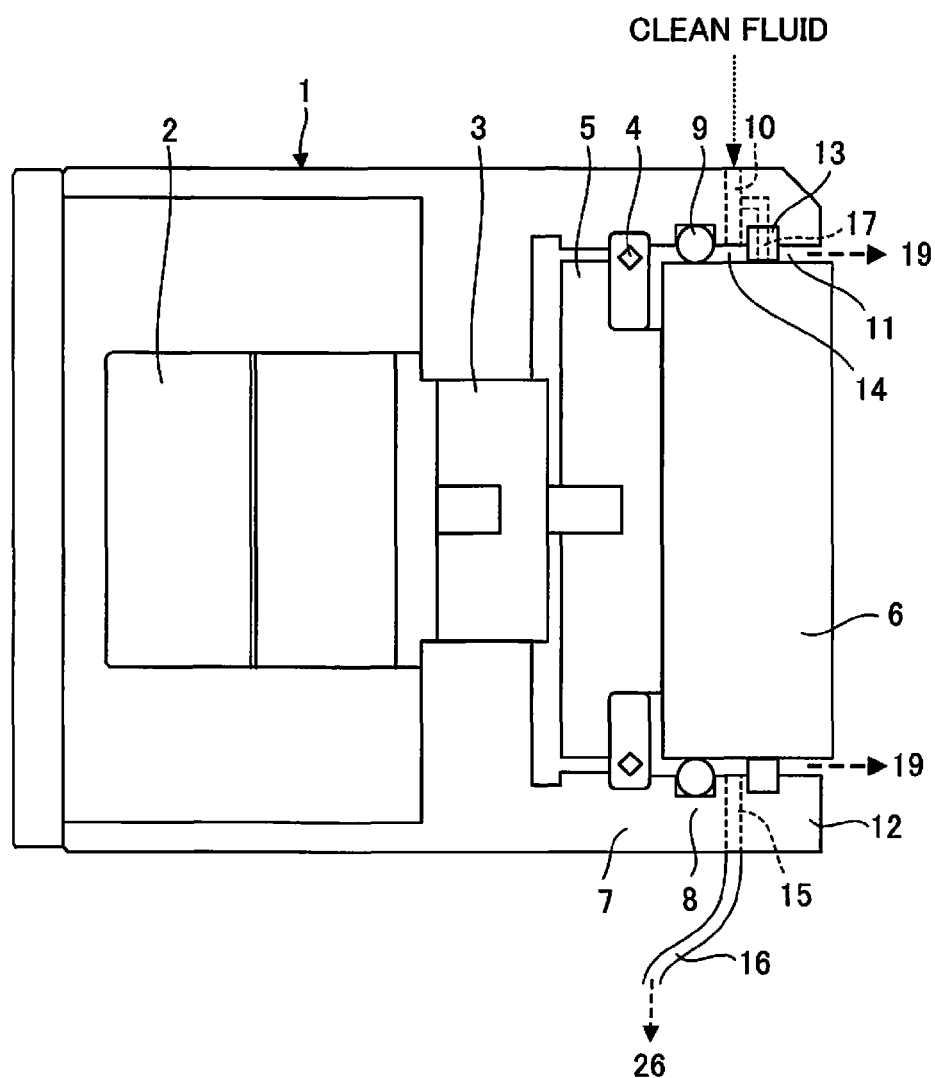
FIG. 4 schematically illustrates a cross section of a rotary table apparatus in which a pipe of a clean working fluid supply unit is provided in an auxiliary sealer.

As illustrated in FIG. 4, the auxiliary sealer 13 may include a pipe 17 so as to further ensure discharge of sludge. Although not shown, the pipe 17 may be provided in the sealer 9. In this case, the shapes of the sealer 9 and the auxiliary sealer 13 in cross section are not limited to circular or rectangular, and may be in other shapes.

Figure 5:
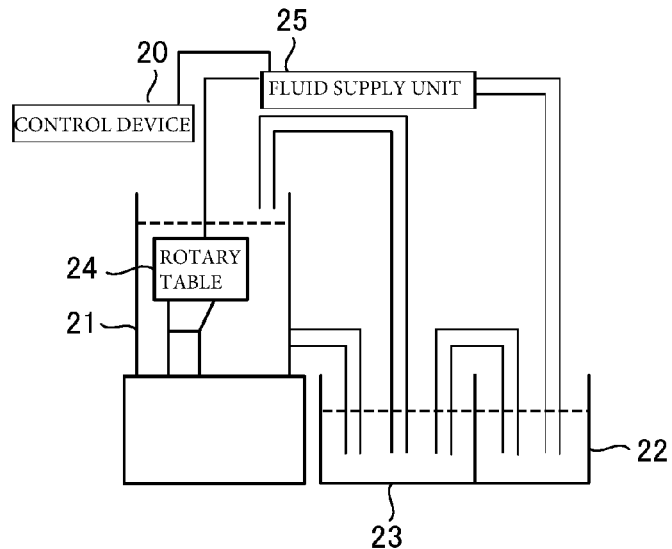
FIG. 5 illustrates a configuration of an electric discharge machine including a rotary table apparatus.
Figure 6:
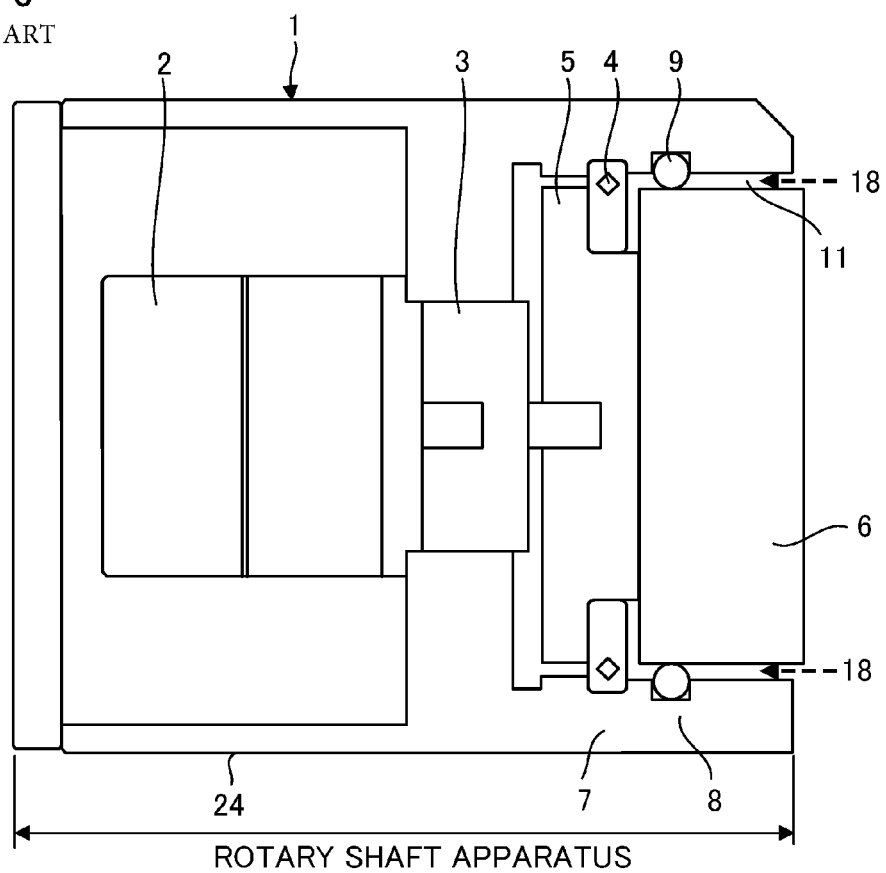
FIG. 6 schematically illustrates a cross section of a conventional rotary table apparatus.

FIG. 5 illustrates a configuration of an electric discharge machine including a rotary table apparatus. The rotary table (rotary table apparatus) 24 is disposed in a work tank 21 such that the rotation axis of the faceplate 6 is oriented vertically, horizontally, or in other directions. Working fluid discharged from the work tank 21 and containing machining waste is stored in a sewage tank 23. The working fluid stored in the sewage tank 23 is supplied to a clean water tank 22 through an unillustrated purification device. The working fluid stored in the clean water tank 22 is clean working fluid purified by the unillustrated purification device. A control device 20 controls a unit for supplying working fluid to the rotary table apparatus 24 (working fluid supply unit 25), pumps purified working fluid from the clean water tank 22, and the obtained fluid is supplied to the rotary table apparatus 24.

In the foregoing embodiment, the rotary table apparatus 24 is applied to an electric discharge machine, and clean working fluid from which machining waste is removed is supplied as clean fluid to be supplied to the rotary table apparatus 24. In the case of applying the rotary table apparatus 24 to systems except the electric discharge machine, fluid for machining typically used for machine tools is used.

The invention claimed is:

1. A rotary table apparatus, comprising:
   a rotary table body;
   a table rotor supported on the rotary table body and configured to be rotatable;
   a power unit configured to supply power to drive the table rotor;
   a seal mechanism including a sealer between the rotary table body and the table rotor;
   a supply pipe configured to supply clean fluid for machining to the seal mechanism; and
   a further pipe branched from the supply pipe and disposed in the sealer of the seal mechanism to guide the clean fluid in the seal mechanism.

2. The rotary table apparatus of claim 1, wherein the seal mechanism is a structure separable from the rotary table body.

3. The rotary table apparatus of claim 1, wherein the seal mechanism has a discharge port configured to discharge the clean fluid for subsequent use in machining.

4. A rotary table apparatus, comprising:
   a rotary table body;
   a table rotor supported on the rotary table body and configured to be rotatable;

a power unit configured to supply power to drive the table rotor;

a seal mechanism including a sealer between the rotary table body and the table rotor;

an auxiliary seal mechanism including an auxiliary sealer between the rotary table body and the table rotor; and a supply pipe configured to supply clean fluid for machining to a space between the sealer of the seal mechanism and the auxiliary sealer of the auxiliary seal mechanism.

5. The rotary table apparatus of claim 4, wherein one or each of the seal mechanism and the auxiliary seal mechanism is a structure separable from the rotary table body.

6. The rotary table apparatus of claim 4, wherein at least one of the seal mechanism or the auxiliary seal mechanism has a discharge port configured to discharge the clean fluid for subsequent use in the machining.

7. The rotary table apparatus of claim 4, further comprising:

a further pipe disposed in the auxiliary sealer of the auxiliary seal mechanism and configured to guide the clean fluid in the auxiliary sealer of the auxiliary seal mechanism.

8. The rotary table apparatus of claim 7, wherein the further pipe disposed in the auxiliary sealer of the auxiliary seal mechanism is branched from the supply pipe.

9. An electric discharge machine, comprising:

a work tank; and a rotary table apparatus including a rotary table body;

a table rotor supported on the rotary table body and configured to be rotatable;

a power unit configured to supply power to drive the table rotor;

a seal mechanism including a sealer disposed between the rotary table body and the table rotor;

a supply pipe configured to supply clean fluid for machining to the seal mechanism; and a pipe branched from the supply pipe and disposed in the sealer of the seal mechanism to guide the clean fluid in the seal mechanism, wherein the rotary table is disposed in the work tank.

10. The electric discharge machine of claim 9, further comprising:

a control device configured to control an amount of the clean fluid for use in machining to be supplied to the supply pipe of the rotary table apparatus.

* * * * *